United States Patent [19]

Fox

[11] Patent Number: 5,590,523
[45] Date of Patent: Jan. 7, 1997

[54] FLOW FOCUSING AND MIXING DEVICE

[76] Inventor: Bryce J. Fox, 3165 Hafner Ct., St. Paul, Minn. 55126

[21] Appl. No.: 258,257

[22] Filed: Jun. 10, 1994

[51] Int. Cl.⁶ .............................. F01N 3/30; F02M 29/00
[52] U.S. Cl. .............................. 60/307; 60/308; 123/590; 123/593
[58] Field of Search .......................... 60/307, 308, 324; 123/590, 593; 138/40, 41, 42, 44

[56] References Cited

U.S. PATENT DOCUMENTS

| | | | |
|---|---|---|---|
| 1,061,655 | 5/1913 | Bachman | 48/189.6 |
| 1,359,279 | 11/1920 | Sansoucy | 48/189.4 |
| 1,401,609 | 12/1921 | Klein | 138/41 |
| 1,780,130 | 10/1930 | Heard | 48/189.4 |
| 2,377,088 | 5/1945 | Linn | 48/189.4 |
| 2,498,190 | 2/1950 | Weeks | 48/189.4 |
| 2,535,410 | 12/1950 | Grevas | 48/189.6 |
| 2,685,504 | 8/1954 | Ulbing | 48/189.4 |
| 3,467,072 | 9/1969 | Toesca | 123/590 |
| 3,630,032 | 12/1971 | Grainger | 60/308 |
| 3,657,878 | 4/1972 | Kaufmann, Jr. | 60/308 |
| 3,666,037 | 5/1972 | Otto et al. | 60/324 |
| 3,682,608 | 8/1972 | Hicks | 48/189.6 |
| 3,747,581 | 7/1973 | Kolb | 123/590 |
| 3,797,241 | 3/1974 | Kern | 60/307 |
| 4,015,575 | 4/1977 | Fox | 123/593 |
| 4,022,176 | 5/1977 | Taylor | 123/593 |
| 4,094,290 | 6/1978 | Diamuke | 48/189.6 |
| 4,114,580 | 9/1978 | Coats | 123/593 |
| 4,187,819 | 2/1980 | Longobardi | 123/590 |
| 4,187,820 | 2/1980 | Webster et al. | 123/593 |
| 4,285,320 | 8/1981 | Webster et al. | 123/593 |
| 4,295,458 | 10/1981 | Pellerin | 123/593 |
| 4,308,845 | 1/1982 | Sarto | 123/549 |
| 4,463,742 | 8/1984 | Williams | 123/590 |
| 4,492,212 | 1/1985 | Dooley | 123/590 |
| 4,751,905 | 6/1988 | Bonfiglioli et al. | 123/470 |
| 5,133,185 | 7/1992 | Gilbreath et al. | 138/40 |
| 5,133,905 | 7/1992 | Woody et al. | 261/35 |

FOREIGN PATENT DOCUMENTS

| | | | |
|---|---|---|---|
| 6781 | of 1899 | United Kingdom | 123/593 |
| 982461 | 2/1965 | United Kingdom . | |
| 2245028 | 12/1991 | United Kingdom . | |

OTHER PUBLICATIONS

"Theoretical Studies of Fuel Droplet Evaporation and Transportation in a Carburetor Venturi", Yun et al., Ford Motor Company, The Univeristy of Michican, dated prior to Jun. 10, 1994.

*Automotive Engineering*, "Chrysler Imperiod Equipped with EFI", vol. 88, No. 10, Oct., 1980.

*Automotive Engineering*, "Lean–Burn Engine Systems Where We Stand Today", vol. 83, No. 10, Oct., 1975.

*Primary Examiner*—Douglas Hart
*Attorney, Agent, or Firm*—Nawrocki, Rooney & Sivertson, P.A.

[57] ABSTRACT

The present invention is a flow focusing and mixing device for use with internal combustion engines. The flow focusing and mixing device may be located in the exhaust stream of an internal combustion engine for increased oxidization of the exhaust, increasing the air quality of the exhaust released into the environment.

26 Claims, 2 Drawing Sheets

FLOW FOCUSING AND MIXING DEVICE

FIELD OF THE INVENTION

The present invention relates to flow focusing and mixing devices. In particular, the present invention relates to a flow focusing and mixing device for use with internal combustion engines.

BACKGROUND OF THE INVENTION

Exhaust emissions from an internal combustion engine contain pollutants such as hydrocarbons (HC) and carbon monoxide (CO), which are very harmful to the environment. In an attempt to reduce these harmful emissions, strict standards have been established for automobiles using these engines. In geographic areas where air quality is a problem, before obtaining a license for an automobile the automobile must pass an emissions inspection. If the automobile fails the emissions inspection, tuning or repairs must be done to the vehicle until the vehicle is able to pass the inspection requirements, or it cannot be driven in that specific geographical area.

In a typical automobile vehicle inspection, the inspector checks to see whether the vehicle has a fuel inlet restrictor, catalytic converter, and unvented fuel cap. While the car is running, the exhaust emissions are tested for the amount of hydrocarbons and carbon monoxide being released into the environment.

Vehicles are required to be equipped with catalytic converters for limiting the amount of hydrocarbons and carbon monoxide released into the environment. While the use of catalytic converters has been found to be effective in limiting the amount of harmful pollutants released into the environment, such converters tend to be costly and eventually require maintenance or replacement.

Exhaust emission pollutants also need to be limited for off-the-road combustion engines, such as those used in lawn mowers, chain saws, snow blowers and monofilament trimmers. Presently, few or no exhaust emission standards exist for this type of engine. With an increasing need for stricter environmental standards, strict emission requirements limiting the amount of hydrocarbons and carbon monoxide released into the air by these engines will also exist in the future.

For off-the-road engines, it is not economically feasible to locate a catalytic converter or similar device on the exhaust stream outlet of these engines. Such a device would be very costly relative to the overall cost of the off-the-road engine itself. Additionally, a catalytic converter may limit the power required for operation of the engine.

The present invention solves these problems of the prior art by providing a simple and economical way to improve engine exhaust and meet environmental air quality restrictions.

SUMMARY OF THE INVENTION

The present invention is an apparatus for use with internal combustion engines for focusing and mixing fluid flow. The apparatus is used in association with an internal combustion engine for increased oxidation of the exhaust, improving the air quality of the exhaust released into the environment.

The apparatus for focusing and mixing fluid flow includes a housing for containing fluid flow entering the housing, the flow being substantially parallel to a longitudinal axis of the housing. A flow focusing and mixing structure is located within the housing for focusing and mixing the flow downstream from the focusing and mixing structure and generally proximate the housing longitudinal axis. The apparatus includes an annular deflector occluding space between the housing and the flow focusing and mixing structure, for deflecting flow radially inward from a wall defining the housing toward the focusing and mixing structure.

In one embodiment, the apparatus for focusing and mixing fluid flow for use with internal combustion engines includes a generally cylindrical housing containing fluid flow entering the housing. The housing has a first end and a second end, wherein the flow enters the first end substantially parallel to a longitudinal axis of the housing. A focusing and mixing structure is located within the housing for focusing and mixing the flow downstream from the focusing and mixing structure, and generally proximate the housing longitudinal axis. The apparatus includes an annular deflector occluding space between the housing and the focusing and mixing structure, for deflecting flow radially inwardly from a wall defining the housing toward the focusing and mixing structure.

The flow focusing structure is generally conical or truncated conical shaped. It may be formed of wire mesh, screen, or other similar perforated metal or nonmetal, such as plastic. Alternatively, the flow focusing structure may consist of a plurality of annular, louvered, coaxial, angled rings in a generally cone shaped configuration. The rings themselves may be louvered and angled for focusing flow to mix at a downstream area. Additionally, the rings may be louvered and located in a common plane, as opposed to being spaced in a generally cone shaped arrangement.

The annular deflector occludes the space between the housing and focusing structure for focusing flow towards the focusing structure. The deflector may be at various angles with the horizontal to achieve the most optimum flow deflection for a given flow focusing and mixing device application. Without an angled annular deflector, flow has a tendency to stall at the annular deflector, and may ultimately result in power loss to the combustion engine and more pollutants in the exhaust emission.

The flow focusing structure itself may consist of a plurality of annular deflector rings each being angled to achieve optimum flow focusing and mixture at a centralized area downstream of the annular deflector rings.

In one embodiment, the flow focusing and mixing device is located downstream from where the exhaust stream leaves an internal combustion engine. The flow focusing and mixing device mixes the exhaust emission, providing improved oxidation of harmful hydrocarbons and carbon monoxide contained in the exhaust emission. Additionally, an outside air inlet may be located upstream of the flow focusing and mixing device, such that the flow focusing and mixing device mixes outside air with the exhaust emission, further oxidizing the exhaust emission.

In one embodiment, the flow focusing device is located downstream from the exhaust emission of an internal combustion engine. An air inlet is located upstream of the flow focusing device. The air, preferably preheated, is admitted into the exhaust stream upstream of the flow focusing device for mixing with the exhaust stream to further oxidize harmful emissions. Additionally, a venturi structure may be located upstream of the flow focusing device for providing flow through the focusing device at a high velocity. An outside air inlet may be connected to the venturi structure for mixing outside air with the exhaust emissions by the flow focusing device. Alternatively, outside air may be introduced into the exhaust stream by an air pump located on the engine for mixing with the exhaust emissions for oxidization of the emissions.

The use of flow focusing devices on internal combustion engines provides a simple, economical, yet efficient way of reducing harmful exhaust emissions from the engine. The flow focusing device is an economical alternative to using a catalytic converter, and becomes especially cost effective for use with off-the-road engines. The use of a flow focusing device results in little or no power loss to the engine, and greater fuel economy. It easily adapts to existing combustion engine applications.

BRIEF DESCRIPTION OF THE DRAWINGS

The invention will be further described with reference to the accompanying drawings where like numbers refer to like parts in several views, and wherein.

DETAILED DESCRIPTION OF THE PREFERRED EMBODIMENTS

Figure 1:
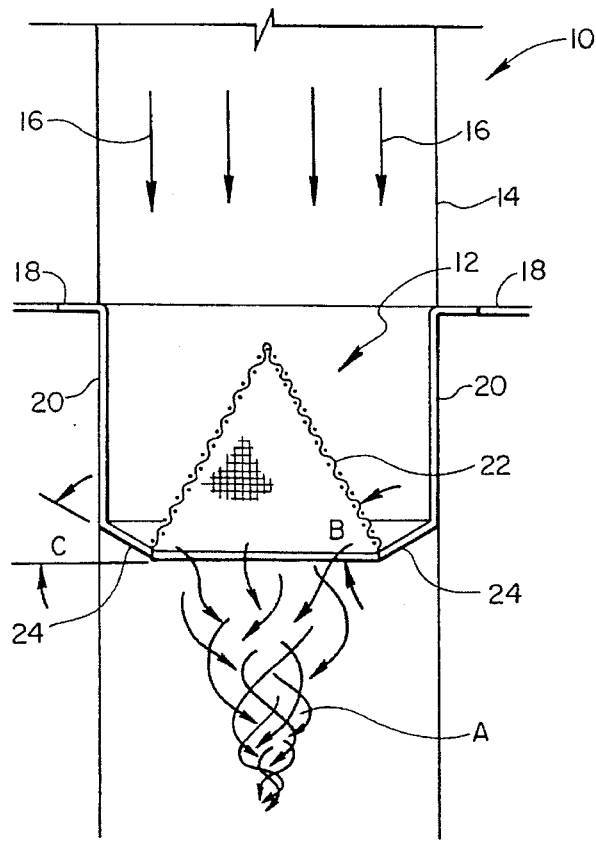
FIG. 1 is a side elevational view, in section, of the flow focusing and mixing device of the present invention installed in a fluid flow system.

FIG. 1 shows a flow focusing and mixing device in an exhaust system generally at 10, including flow focusing device 12. The flow focusing device 12 is located within an exhaust conduit 14, downstream from the point where the exhaust stream leaves the combustion engine. The exhaust stream is indicated by flow direction arrows at 16.

Flow focusing device 12 includes flange 18, cylindrical rise wall 20, focusing structure 22, and deflector ring 24. Flange 18 is located at one end of cylinder rise wall 20. Flow focusing device 12 is secured to exhaust conduit 14 at flange 18. Flange 18 is attached to exhaust conduit 14 by known methods such as bolting or spot welding.

Cylindrical rise wall 20 is of a diameter such that it fits closely within the interior of exhaust conduit 14. Focusing structure 22 is located within cylindrical rise wall 20. Deflector ring 24 is connected to cylindrical rise wall 20 at the end opposite flange 18. Deflector ring 24 is connected between cylindrical rise wall 20 and focusing structure 22.

Figure 2:
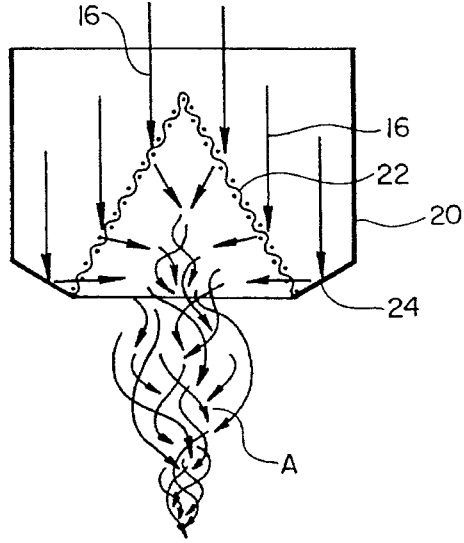
FIG. 2 is a side sectional view of the flow focusing and mixing device shown in FIG. 1.

The exhaust emission stream leaving the internal combustion engine, indicated by exhaust flow arrows 16, generally flow in a direction parallel to the exhaust conduit 14 walls and cylindrical rise wall 20. As shown in FIG. 2, when exhaust flow arrows 16 pass through flow focusing device 12, they are redirected to a central area A. At central area A, exhaust flow 16 converges and mixes together, resulting in further oxidization of exhaust emissions. Deflector ring 24 redirects flow along cylindrical rise wall 20 towards focusing structure 22, which in turn directs the exhaust flow into central area A.

Oxidization of exhaust stream emissions results in a cleaner exhaust released into the atmosphere which is less harmful to the environment. Typically, exhaust is made up of harmful hydrocarbons and carbon monoxide. When oxidized, the oxidized carbon monoxide changes to less harmful carbon dioxide, and the oxidized hydrocarbons break into various compounds, with the hydrogen element changing to water vapor and the carbon element changing to carbon dioxide. The greater the oxidization of the exhaust emissions, the less harmful pollutants are released into the environment.

In a preferred embodiment shown in FIG. 1, focusing structure 22 is cone shaped and is formed from a mesh screening. Preferably, the screening has between 30 and 70 perforations per inch. It is recognized that the perforation concentration may vary with each flow focusing application.

As shown in FIG. 1, the wall of focusing structure 22 and the angle of deflector ring 24 may also vary, based on the specific performance requirements for each individual application. In this embodiment, the angle that focusing structure 22 makes with the horizontal indicated at B is approximately 60 degrees, and the angle the deflector ring 24 makes with the horizontal shown at C, is approximately 30 degrees. The preferable range of angle B is between 40 degrees and 70 degrees, and the preferable range of angle C is between 10 degrees and 70 degrees based on the requirements of each specific application.

Figure 3:
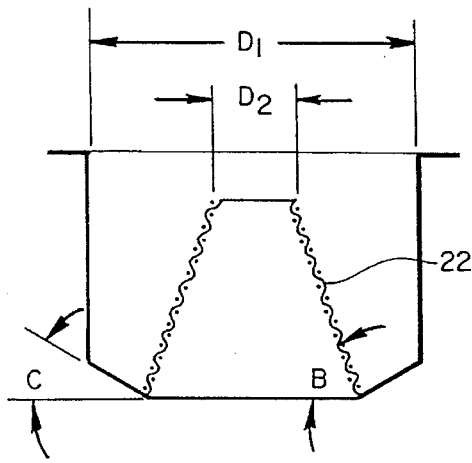
FIG. 3 is a side sectional view showing an alternative embodiment of the flow focusing and mixing device shown in FIG. 1.

Focusing structure 22 may take on various shapes and sizes, while remaining within the scope of the focusing and mixing structure of the present invention. For example, FIG. 3 shows the flow focusing device 12 of the present invention having a focusing structure 22 in the shape of a truncated cone. In one embodiment, cylindrical rise wall 20 has a diameter D1 and the truncated end of focusing structure 22 has a diameter D2. Truncated focusing structure diameter D2 is about ½ the diameter of cylindrical rise wall D1. Deflector ring 24 has a width of about 5/32 inch wide with angle C equal to approximately 30 degrees and angle B being approximately 60 degrees.

Figure 4:
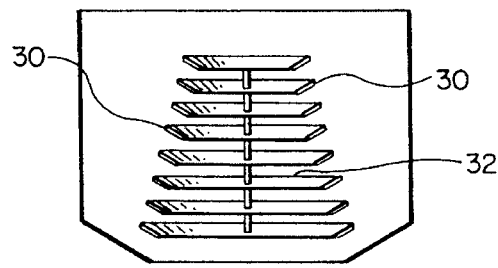
FIG. 4 is a side sectional view showing an additional alternative embodiment of the flow focusing and mixing device shown in FIG. 1.

Similarly, FIG. 4 is an alternative embodiment of the present invention. In FIG. 4, the focusing structure 22 is comprised of a plurality of concentric annular or louvered rings 30. The louvered rings 30 together take on a truncated cone shape, and are angled for focusing flow of the exhaust stream into control mixing area A.

Additionally, concentric rings 30 may include turbulence devices 32 to provide increased flow turbulence for better mixing at central area A. The turbulence devices 32 are located on the surfaces of the concentric rings 30. As the exhaust stream 16 flows across the concentric rings 30, the turbulence devices 32 create additional turbulence in the exhaust stream 16 focus towards central area A, resulting in improved mixing of flow at central area A.

Figure 5:
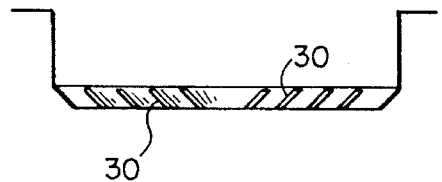
FIG. 5 is a side sectional view showing another alternative embodiment of the flow focusing and mixing device shown in FIG. 1.

Similar to FIG. 4, FIG. 5 is a flow focusing device 12 which includes a focusing structure 22 comprised of concentric annular or louvered rings 30. In FIG. 5, the annular or louvered rings are all located in substantially the same horizontal plane. This configuration allows flow focusing device 12 to be located in a more restricted physical space, while still providing focusing and mixing of exhaust stream 16 for improved oxidization of the exhaust.

Figure 6:
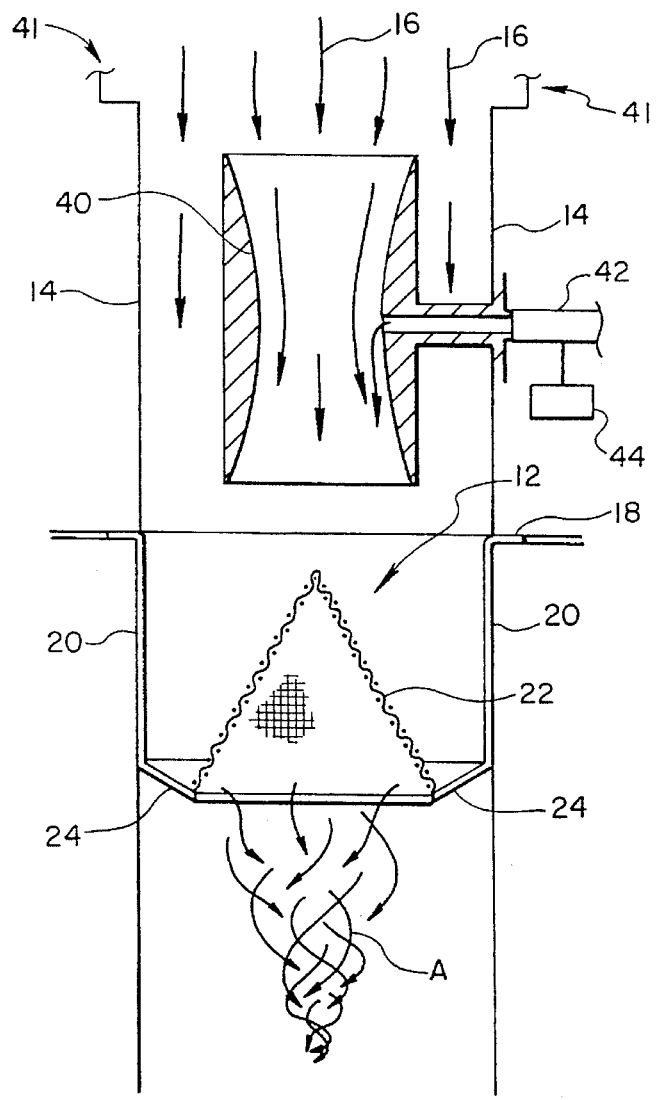
FIG. 6 is a side elevational view, in section, of the flow focusing and mixing device in an exhaust emission application.

FIG. 6 shows an additional, specific application of the present flow focusing device 12. Flow focusing device 12 is located downstream from a port, such as exhaust manifold 41, where the exhaust stream leaves the internal combustion engine. Located upstream of the flow focusing device 12 is a venturi tube 40 with an outside air inlet 42. Additionally, outside air inlet 42 is connected to venturi tube 40. In such a configuration, outside air is drawn through outside air inlet tube 42 into exhaust conduit 14. Flow focusing and mixing device 12 mixes the outside air with the exhaust stream, at area A oxidizing exhaust stream 16. The introduction of outside air further oxidizes harmful pollutants contained in the exhaust stream.

For increased oxidization, the outside air drawn through outside air inlet 42 is preheated, increasing the oxidization process of exhaust 16. The air may be preheated in conventional ways. Alternatively, an air pump 44 may be located on the combustion engine such that outside air is pumped into exhaust conduit 14 before it enters flow focusing and mixing device 12.

Flow focusing and mixing device 12 is easily adaptable to new and old exhaust systems. The flow focusing and mixing device is very useful as an economical way to upgrade automobile and off-the-road engine exhaust systems to meet air quality emission standards.

The use of flow focusing device 12 in exhaust conduit 14 greatly improves the oxidization of the exhaust stream which results in cleaner exhaust being released into the atmosphere. Flow focusing device 12 is an economical and cost-effective way of providing cleaner exhaust emissions from combustion engines, especially in off-the-road applications.

It will be understood that this disclosure is, in many respects, only illustrative. Changes may be made in details, particularly in matters of shape, size, material, and arrangement of parts, without exceeding the scope of the invention. Accordingly, the scope of the invention is as defined in the language of the appended claims.

What is claimed:

1. Apparatus for use with internal combustion engines for converging and mixing fluid flow, comprising:
   a. a generally cylindrical housing containing fluid flow entering the housing, the housing have a first end and a second end, wherein the flow enters the first end substantially parallel to a longitudinal axis of the housing;
   b. means, located within the housing, for converging and mixing the flow downstream from said means for converging and mixing at a central area and generally proximate the housing longitudinal axis; and
   c. annular means, occluding space between the housing and said means for converging and mixing, for deflecting flow radially inwardly from a wall defining the housing toward the means for converging and mixing.

2. The apparatus of claim 1, further including means for mounting the apparatus in the exhaust stream of the engine.

3. The apparatus of claim 1, wherein said means for deflecting is angled, relative the wall defining the housing, radially inwardly and in a direction of fluid flow.

4. The apparatus of claim 3, wherein the deflecting angle, defined by the wall and the deflecting means, the angle having a vertex defined by their juncture point, is between 100 degrees and 170 degrees.

5. The apparatus of claim 4, wherein said means for converging and mixing is porous and generally cone shaped.

6. The apparatus of claim 1, wherein said means for converging and mixing is porous and generally cone shaped.

7. The apparatus of claim 1, wherein the focusing and mixing means is formed of a plurality of coaxial, angled rings arranged to define a generally truncated cone shape.

8. The apparatus of claim 7, wherein the coaxial rings include turbulence generation means.

9. The apparatus of claim 1, wherein said means for converging and mixing is formed of concentric rings arranged to define a common plane.

10. An exhaust flow converging and mixing device, the device being located in a conduit through which an exhaust stream from an engine is vented, comprising:
    a. a housing for containing flow entering the housing, the housing having a first end and a second end;
    b. means for attaching the housing to the exhaust conduit; and
    c. means, mounted within the housing, and through which the exhaust flow passes, for converging and mixing the exhaust flow at a central area exiting the housing,
    wherein said means for coverging and mixing includes a plurality of concentric louvered rings in a generally truncated cone shaped form.

11. The exhaust flow converging and mixing device of claim 10, wherein the means for attaching the housing to the exhaust conduit includes a flange located at the first end of the housing, the flange being clamped, bolted or spot-welded to the exhaust conduit.

12. An exhaust flow converging and mixing device, the device being located in a conduit through which an exhaust stream from an engine is vented, comprising:
    a. a housing for containing flow entering the housing, the housing having a first end and a second end;
    b. means for attaching the housing to the exhaust conduit; and
    c. means, mounted within the housing, and through which the exhaust flow passes, for converging and mixing the exhaust flow at a central area exiting the housing wherein said means for converging and mixing is generally cone shaped.

13. The exhaust flow converging and mixing device of claim 10, wherein at least one concentric ring includes turbulence means for further mixing of the flow.

14. An exhaust flow converging and mixing device, the device being located in a conduit through which an exhaust stream from an engine is vented, comprising:
    a. a housing for containing flow entering the housing, the housing having a first end and a second end;
    b. means for attaching the housing to the exhaust conduit; and
    c. means, mounted with in the housing, and through which the exhaust flow passes, for converging and mixing the exhaust flow at a central area exiting the housing wherein said means for converging and mixing includes concentric louvered rings which are located in a common plane generally perpendicular to the flow.

15. An exhaust flow converging and mixing device, the device being located in a conduit through which an exhaust stream from an engine is vented, comprising:
    a. a housing for containing flow entering the housing, the housing having a first end and a second end;
    b. means for attaching the housing to the exhaust conduit;
    c. means, mounted within the housing, and through which the exhaust flow passes, for converging and mixing the exhaust flow at a central area exiting the housing; and
    d. deflector means connected between the housing second end and said means for converging and mixing for deflecting substantially parallel exhaust flow along the housing towards the converging means.

16. An exhaust flow converging and mixing device, the device being located in a conduit through which an exhaust stream from an engine is vented, comprising:

a. a housing for containing flow entering the housing, the housing having a first end and a second end;

b. means for attaching the housing to the exhaust conduit;

c. means, mounted within the housing and through which the exhaust flow passes, for converging and mixing the exhaust flow at a central area exiting the housing; and d. deflector means connected between the housing second end and said means for converging and mixing for deflecting substantially parallel exhaust flow along the housing towards the converging means wherein the deflector means includes a deflector rang which is angled, the angle being defined by the deflector ring and a wall defining the housing.

17. An exhaust flow converging and mixing device, the device being located in a conduit through which an exhaust stream from an engine is vented, comprising:

a. a housing for containing flow entering the housing, the housing having a first end and a second end;

b. means for attaching the housing to the exhaust conduit;

c. means, mounted within the housing, and through which the exhaust flow passes, for converging and mixing the exhaust flow at a central area exiting the housing; and d. deflector means connected between the housing second end and said means for converging and mixing for deflecting substantially parallel exhaust flow along the housing towards the converging means wherein the deflector means includes a deflector ring which is angled, the angle being defined by the deflector ring and a wall defining the housing, and wherein the deflector ring angle defined by the deflector ring and the wall defining the housing, having a vertex at their point of connection, is between 100 and 170 degrees.

18. An exhaust oxidization system for oxidizing an exhaust flow stream of an engine, the exhaust oxidization system being located in a conduit downstream from where the exhaust stream leaves the engine, the exhaust oxidization system including:

a. air inlet means for introducing outside air into the conduit; and b. means located in the conduit downstream of the air inlet means for receiving the exhaust stream and outside air, and for converging and mixing the exhaust stream and outside air downstream from said means for converging and mixing at a central area for oxidization of the exhaust stream wherein the means for converging and mixing is generally cone shaped.

19. An exhaust oxidization system for oxidizing an exhaust flow stream of an engine, the exhaust oxidization system being located in a conduit downstream from where the exhaust stream leaves the engine, the exhaust oxidization system including:

a. air inlet means for introducing outside air into the conduit; and b. means located in the conduit downstream of the air inlet means for receiving the exhaust stream and outside air, and for converging and mixing the exhaust stream and outside air downstream from said means for converging and mixing at a central area for oxidization of the exhaust stream wherein said means for converging and mixing includes concentric louvered rings in a generally cone shaped form.

20. An exhaust oxidization system for oxidizing an exhaust flow stream of an engine, the exhaust oxidization system being located in a conduit downstream from where the exhaust stream leaves the engine, the exhaust oxidization system including:

a. air inlet means for introducing outside air into the conduit; and b. means located in the conduit downstream of the air inlet means for receiving the exhaust stream and outside air, and for converging and mixing the exhaust stream and outside air downstream from said means for converging and mixing at a general area for oxidization of the exhaust stream wherein said means for converging and mixing includes concentric louvered rings in a generally cone shaped form wherein the concentric rings include turbulence means for further mixing of the flow.

21. An exhaust oxidization system for oxidizing an exhaust flow stream of an engine, the exhaust oxidization system being located in a conduit downstream from where the exhaust stream leaves the engine, the exhaust oxidization system including:

a. air inlet means for introducing outside air into the conduit; and b. means located in the conduit downstream of the air inlet means for receiving the exhaust stream and outside air, and for converging and mixing the exhaust stream and outside air downstream from said means for converging and mixing at a central area for oxidization of the exhaust stream c. deflector means coupled to the means for converging and mixing for deflecting substantially parallel exhaust flow along the housing towards the means for converging and mixing.

22. The exhaust oxidization system of claim 21, wherein the deflector means includes a deflector ring which is angled, the angle being defined by the deflector ring and said means for converging and mixing.

23. The exhaust oxidization system of claim 18, wherein the outside air introduced into the conduit is preheated.

24. The exhaust oxidization system of claim 18, further including:

a. venturi means located upstream of the means for converging and mixing for receiving the exhaust flow stream, the venturi having a low pressure area and an outside air connecting tube at the low pressure area of the venturi to induce outside air to enter and mix with the exhaust flow.

25. The exhaust oxidization system of claim 24, wherein the air inlet means is connected to the venturi means.

26. The exhaust oxidization system of claim 18, wherein the air inlet means includes an air pump located on the engine for introducing air into the conduit.

\* \* \* \* \*

UNITED STATES PATENT AND TRADEMARK OFFICE
CERTIFICATE OF CORRECTION

PATENT NO.   : 5,590,523
DATED        : January 7, 1997
INVENTOR(S)  : Fox

It is certified that error appears in the above-identified patent and that said Letters Patent is hereby corrected as shown below:

Column 6, line 45, change "with in" to --within--.

Column 7, line 11, change "rang" to --ring--.

Column 8, line 16, change "general" to --central--.

Signed and Sealed this

Eighth Day of April, 1997

Attest:

BRUCE LEHMAN

Attesting Officer

Commissioner of Patents and Trademarks